(12) United States Patent
Webb et al.

(10) Patent No.: US 11,905,756 B2
(45) Date of Patent: Feb. 20, 2024

(54) POLYMERIC WIND AND DEBRIS RESISTANT GARAGE DOOR WINDOW FRAME AND METHOD OF MANUFACTURE

(71) Applicant: National Door Industries, Inc., Fort Worth, TX (US)

(72) Inventors: James P. Webb, Arlington, TX (US); Jorge Prieto, Fort Worth, TX (US)

(73) Assignee: National Door Industries, Inc., Fort Worth, TX (US)

( * ) Notice: Subject to any disclaimer, the term of this patent is extended or adjusted under 35 U.S.C. 154(b) by 60 days.

(21) Appl. No.: 17/199,606

(22) Filed: Mar. 12, 2021

(65) Prior Publication Data

US 2021/0293082 A1 Sep. 23, 2021

Related U.S. Application Data

(60) Provisional application No. 62/991,916, filed on Mar. 19, 2020.

(51) Int. Cl.
*E06B 5/12* (2006.01)
*E06B 3/58* (2006.01)
(Continued)

(52) U.S. Cl.
CPC .............. *E06B 5/12* (2013.01); *B29C 48/001* (2019.02); *B29C 65/2076* (2013.01); *E06B 3/5892* (2013.01); *E06B 2003/7044* (2013.01)

(58) Field of Classification Search
CPC . E06B 3/5892; E06B 5/12; E06B 5/10; E06B 1/32; B29C 66/52431
See application file for complete search history.

(56) References Cited

U.S. PATENT DOCUMENTS 2,374,056 A 4/1945 Watkins
4,897,975 A 2/1990 Artwick et al.
(Continued)

FOREIGN PATENT DOCUMENTS

BE 1011995 A6 * 3/2000 ............... E06B 1/30
DE 102012112533 A1 * 7/2013 ......... B29C 65/2053
(Continued)

OTHER PUBLICATIONS

DE-102012112533-A1 machine translation (Year: 2013).*
EP-1889708-A1 machine translation (Year: 2008).*
BE-1011995-A6 Machine Translation (Year: 2000).*

*Primary Examiner* — Michael W Hotchkiss
(74) *Attorney, Agent, or Firm* — Whitaker Chalk Swindle & Schwartz, PLLC; Charles D. Gunter, Jr.

(57) ABSTRACT

A window frame assembly for installation within a garage door having front and rear exposed surfaces and one or more window openings. The assembly includes front and rear window frame members which are installed within the door openings in the garage door. The front and rear members are brought toward each other to sandwich the borders of each of the window openings while also capturing an associated transparent pane. A series of fastening members are used to hold the front and rear frame members securely against each other. The front and rear window frame members are made of synthetic polymeric starting stock starting materials which, together with the transparent panes, are able to withstand hurricane force winds and associated blowing debris.

3 Claims, 10 Drawing Sheets

(51) Int. Cl.
  *B29C 48/00* (2019.01)
  *B29C 65/20* (2006.01)
  *E06B 3/70* (2006.01)

(56) References Cited

U.S. PATENT DOCUMENTS

| | | | | |
|---|---|---|---|---|
| 4,947,597 A * | 8/1990 | Simpson | E06B 3/5892 | 52/204.593 |
| 5,018,330 A * | 5/1991 | Lewkowitz | E06B 3/5892 | 52/455 |
| 5,379,518 A * | 1/1995 | Hopper | E06B 3/5857 | 29/415 |
| 5,765,325 A * | 6/1998 | DeBlock | E06B 3/66 | 52/204.63 |
| 6,076,314 A * | 6/2000 | Simonton | E06B 3/44 | 52/204.5 |
| 6,260,251 B1 * | 7/2001 | Guhl | E06B 3/22 | 52/843 |
| 6,357,197 B1 * | 3/2002 | Serino | E06B 3/205 | 52/847 |
| 6,490,839 B1 * | 12/2002 | Macquart | B29C 65/7829 | 156/304.6 |
| 6,553,735 B1 * | 4/2003 | Wang Chen | E06B 3/5892 | 52/204.6 |
| 6,711,861 B2 | 3/2004 | Berger | | |
| 6,715,245 B2 * | 4/2004 | Lewkowitz | E06B 3/5892 | 52/204.591 |
| 6,763,647 B2 | 7/2004 | Yeany | | |
| 6,837,011 B2 | 1/2005 | Berger | | |
| 7,257,927 B2 * | 8/2007 | Sayer | E06B 1/6046 | 52/204.597 |
| 7,437,856 B2 * | 10/2008 | Berger, Jr. | E06B 3/5892 | 52/208 |
| 7,721,501 B2 * | 5/2010 | Lynch | E06B 3/78 | 52/456 |
| 8,201,367 B2 * | 6/2012 | Barnard | E06B 3/5892 | 52/745.15 |
| 8,500,945 B2 * | 8/2013 | Brown | E06B 3/9608 | 160/381 |
| 9,022,091 B2 * | 5/2015 | Shives | E06B 3/485 | 160/201 |
| 9,290,989 B2 * | 3/2016 | Lynch | E06B 3/5892 | |
| 10,597,930 B2 * | 3/2020 | Kornish | E06B 3/7001 | |
| 10,829,983 B2 * | 11/2020 | Haba | E06B 3/549 | |
| 2004/0226233 A1 * | 11/2004 | LaSee | E06B 3/5892 | 52/204.5 |
| 2005/0028458 A1 * | 2/2005 | Rosskamp | E06B 3/5481 | 52/172 |
| 2005/0028460 A1 * | 2/2005 | Steffek | E06B 3/24 | 52/204.5 |
| 2005/0055906 A1 | 3/2005 | Barnard | | |
| 2006/0198124 A1 * | 9/2006 | Copland | E06B 3/5892 | 362/145 |
| 2007/0169426 A1 * | 7/2007 | Allen | E06B 3/5892 | 52/204.59 |
| 2007/0193140 A1 * | 8/2007 | Carnick | E06B 3/5892 | 52/208 |
| 2007/0261326 A1 | 11/2007 | Krochmal et al. | | |
| 2008/0245003 A1 * | 10/2008 | Kon | E06B 3/5892 | 49/506 |
| 2010/0251635 A1 * | 10/2010 | Barnard | E06B 3/5892 | 52/745.15 |
| 2010/0287839 A1 * | 11/2010 | Barnard | E06B 3/5892 | 49/506 |
| 2010/0324189 A1 * | 12/2010 | Brockmuller | E06B 3/221 | 524/502 |
| 2017/0167185 A1 * | 6/2017 | Boer | E06B 1/6061 | |
| 2017/0247937 A1 * | 8/2017 | Haba | E06B 3/54 | |
| 2018/0238102 A1 * | 8/2018 | Kornish | E06B 3/485 | |
| 2019/0111643 A1 * | 4/2019 | Wang | E06B 3/20 | |
| 2019/0381748 A1 * | 12/2019 | Matsuda | E06B 3/9604 | |
| 2020/0122408 A1 * | 4/2020 | Greller | B29C 66/73921 | |

FOREIGN PATENT DOCUMENTS

| | | | | |
|---|---|---|---|---|
| EP | 1889708 A1 * | 2/2008 | | B29C 65/2069 |
| GB | 2585618 A * | 1/2021 | | E06B 3/549 |
| WO | WO-2021024111 A1 * | 2/2021 | | B29C 65/20 |

* cited by examiner

POLYMERIC WIND AND DEBRIS RESISTANT GARAGE DOOR WINDOW FRAME AND METHOD OF MANUFACTURE

CROSS-REFERENCE TO RELATED APPLICATION

The present application claims priority to U.S. Provisional Patent Application Ser. No. 62/991,916 filed Mar. 19, 2020, by the same inventor and with the same title.

BACKGROUND OF THE INVENTION

1. Field of the Invention

The present invention relates generally to a window frame assembly for an overhead garage door and, more specifically, to such a window frame assembly that is able to withstand high winds and flying objects and to a method of manufacturing such a window frame assembly from a synthetic, polymeric starting stock.

2. Description of the Prior Art

Garages, warehouses and other similar structures are often fitted with overhead sectional doors. A sectional door typically includes a series of horizontally arrayed sections or panels joined by hinges into a door unit. As the door opens or closes, the door panels travel along two lateral tracks that, in one configuration, curve between horizontal and vertical. To close the door, the tracks guide the panels to a vertical position. When the door opens, the pivotal joints allow the panels to curve around onto the horizontal section of the tracks, where the door panels store horizontally overhead. Such doors can be powered up or down, or can be manually operated. To ease the operation of the door, a torsion spring is often used to offset the weight of the door panels. Overhead doors of the type under consideration are commonly used as a residential garage door but are also often used in warehouses and other industrial buildings. In the discussion which follows, the term "overhead door" will be understood to mean the common overhead garage door, but also is intended to encompass the other uses of such overhead doors, such as warehouse doors, and the like.

Customarily, each of the sections or panels of the door are fabricated separately and thereafter hinged together along a longitudinal edge to provide the complete overhead door structure.

Historically, the sections are fabricated from a galvanized and/or prepainted sheet metal stock which has been rolled or otherwise formed into the particular section facing, web and parallel interior flange configurations. Vertical stiles are usually secured to the section facing and interior flanges at spaced locations by spot weld or rivet techniques. Most prior art overhead door systems use hinges that are secured directly to the section stiles. While a majority of garage doors continue to be manufactured from mild steel stock, some manufacturers offer overhead doors made from synthetic materials such as from various types of vinyl.

Particularly in the area of residential garage doors, a number of manufacturers offer plastic or metal window frame assemblies which are fitted within openings provided in the garage door and which typically feature a central opening which contains a transparent pane which may be of glass, plastic or such newer materials as acrylics and polycarbonates. The central opening in the window frame assembly may also contain a decorative trim member which is sandwiched between the transparent pane and other framing components.

While the prior art window frame assemblies of this type are acceptable in many situations, there exists a special need for window frame assemblies which are more capable of withstanding high winds and flying debris in some areas of the country, for example where hurricanes or tornadoes may occur more frequently. Local construction codes include wind tests that often require reinforcements of these window frame assemblies and many times these added structures detract from the aesthetics of the window design. They also add to the cost of the window frames and add to the complexity of the window frame installation.

U.S. Pat. No. 8,201,367, issued Jun. 19, 2012, to Barnard et al., and assigned to the assignee of the present invention describes an improved wind and debris resistant garage door window frame which featured an exterior frame member which was stated to be formed of metal or a synthetic material and an interior frame member formed of metal. In practice, both the exterior and interior frame members were formed of metal, since it was thought that the added strength provided by a metal construction would be needed to produce a frame that could withstand, for example, hurricane strength conditions.

The debris and wind resistant window frame design shown in the '367 patent represented a substantial advance in the art at the time. However, there continues to exist a need for such a wind and debris resistant window frame which can be manufactured from synthetic, polymeric materials. An inherent problem of using metal for the component parts of the window frame assembly lies in the difficulty of decorating or painting the metal pre- or post-installation—the metal frame often has to be etched, sanded, and primed before it can be painted. This adds additional time and materials costs to the manufacturer of the frames, costs that are compounded as the frames are mass-produced for use by garage door owners. Using synthetic materials as the starting components presents the potential for speeding up the manufacturing and assembly line operation. Significant cost savings should be realized.

Thus, despite the advantages offered by the prior art window frame constructions known in the art, there continues to exist a need for improvements in the area of garage door window frame construction and installation techniques, especially in high wind situations where flying debris and other hazards may exist.

SUMMARY OF THE INVENTION

It is one of the main objects of the present invention to provide a window frame and method for manufacturing such a window frame which can be used as a part of a frame assembly for a garage door that is capable of withstanding high wind and flying debris conditions.

Another object of the invention is to provide such a wind and debris resistant frame which is capable of achieving impact and tensile strength requirements, in part, by absorbing and distributing any impact energy into the frame assembly itself, while at the same time utilizing synthetic, polymeric frame components.

It is a further object of the present invention to provide a window frame assembly for an overhead garage door which provides a decorative and aesthetically pleasing appearance, while securely supporting the various window frame components of the overall assembly.

It is a further object to provide a versatile window frame assembly that can accommodate various other trim components that may abut the frame components.

Another object of the invention is to provide a garage door window frame design which ensures that the assembled frame will more nearly provide even pressure on all four sides of the transparent pane which is contained within the window opening provided in the window frame. Likewise, the preferred frame construction will ensure that constant and even pressure are maintained on the garage door panel by the assembled frame, making sure the exterior frame member maintains contact with the outside of the garage door panel around the full perimeter of the frame.

It is still another object of the present invention to provide a window assembly for garage door panels that is easy to install and which can be manufactured more economically than using prior art manufacturing techniques, while retaining its effectiveness in high wind prone areas of the country.

In one preferred aspect, the new manufacturing process for forming the wind and debris resistant frames of the invention begins by providing a starting stock of a synthetic, polymeric plastic type material. A plurality of strips of the plastic material are either extruded or injection molded to a desired length. The ends of the extruded plastic strips are then cut at a 45 degree angle using a suitable saw. Selected ones of the corners of the plastic strips are then joined at 45 degree angles by fusing the corners together. This can conveniently be accomplished using a hot plate welder to create a pair of frame halves. Assembly holes can then be drilled in the frame halves and the frame halves can be caulked. Glazing is then installed between the frame halves and fixing members are installed in the assembly holes so that the frame halves are assembled to form an assembled frame.

In one case, the plastic strips are formed of a starting stock of a synthetic polymeric plastic material which includes a coloring additive prior to extrusion. In another case, the plastic strips are formed of a starting stock of a synthetic polymeric plastic material which is uncolored prior to assembly. In one particularly preferred case, the frame members comprise an exterior frame member and an interior frame member and wherein different starting stocks are used for the exterior and interior frame members. The interior frame member can be, for example, a high impact strength and high tensile strength Nylon-6 polymer which is preferably extrudable. The exterior frame member can be, for example, a weatherable, high impact strength and high tensile strength, paintable ASA polycarbonate polymer blend. By using these particular families of starting materials as the starting stock of the manufacturing process, polymeric frame assemblies have been produced with resulting tensile strengths which meet or exceed 8,000 psi in testing.

The particular mechanical design features of the frame components of the frame assembly also contribute to the resulting requisite tensile strength and impact resistance required for the task at hand. For example, when the front frame member is assembled, the combined outer peripheral portions of the front frame member strips are sized to circumscribe the garage window opening from the front exposed surface of the garage door once the assembly is installed in the garage door. The combined inner peripheral portions of the front frame member strips are sized to circumscribe an edge of a transparent pane once said pane is installed in the assembly, whereby the front and rear frame members cooperate, upon assembly, to securely grip the transparent pane with the transparent pane sandwiched therebetween.

In one preferred design, the inner peripheral portion of the front frame member comprises a flange region which overlays an outer periphery of the transparent pane, and wherein an internal wall extends perpendicularly from the inner peripheral portion generally perpendicular thereto, thereby creating a right-angled cavity in the interior of the frame assembly. The internal wall also forms one side of an internal baffle, and wherein the right-angled cavity which is formed by the internal wall and the flange region together form a positive stop region for the outer periphery of the transparent pane, holding it securely in position.

A selected one of the honeycomb regions of the rear frame member has an interior wall portion arranged perpendicular to the outer periphery of the transparent pane, the selected honeycomb region also has a circumferential rib which is received within a mating groove provided on the transparent pane. Upon assembly, the front frame member internal wall is arranged coincident with and fully contacting the interior wall portion of a honeycomb region of the rear frame member upon assembly, whereby the pane is securely retained in the frame assembly. Upon assembling the front and rear frame members and transparent pane within the window opening of the garage door, impact forces transmitted to the transparent pane are absorbed in the honeycomb regions of the assembled frame while the cooperating rib and groove arrangement securely grips the transparent pane between the front and rear frame members.

Other aspects of the present invention will be described in more detail in the written description which follows, further describing a manufacturing method for producing a simple window assembly of polymeric components which is capable of retaining its transparent panel while absorbing the impact energy of high winds and flying objects.

Additional objects, features and advantages will be apparent in the written description which follows.

BRIEF DESCRIPTION OF THE DRAWINGS

FIG. 2 is an exploded view of a window frame assembly of the invention showing the front and rear frame members with a transparent pane located there between.

DETAILED DESCRIPTION OF THE INVENTION

The preferred version of the invention presented in the following written description and the various features and advantageous details thereof are explained more fully with reference to the non-limiting examples included and as detailed in the description which follows. Descriptions of well-known components and processes and manufacturing techniques are omitted so as to not unnecessarily obscure the principal features of the invention as described herein. The examples used in the description which follows are intended merely to facilitate an understanding of ways in which the intention may be practiced and to further enable those skilled in the art to practice the invention. Accordingly, the examples should not be construed as limiting the scope of the claimed invention.

As discussed briefly above, commercially available garage doors used at the present time are typically assembled from a series of door sections aligned horizontally in an edge-to-edge configuration to form a vertically oriented door for the garage opening. The sections are hinged together as a series along their abutting, horizontal edges to allow the garage door to be raised upwardly in a track to an overhead, horizontal position. The track includes a curved section between the vertical and the overhead positions. The hinged sections allow the garage door to traverse this curved section during the transition of the garage door from the vertical to the overhead, horizontal position.

Figure 1:
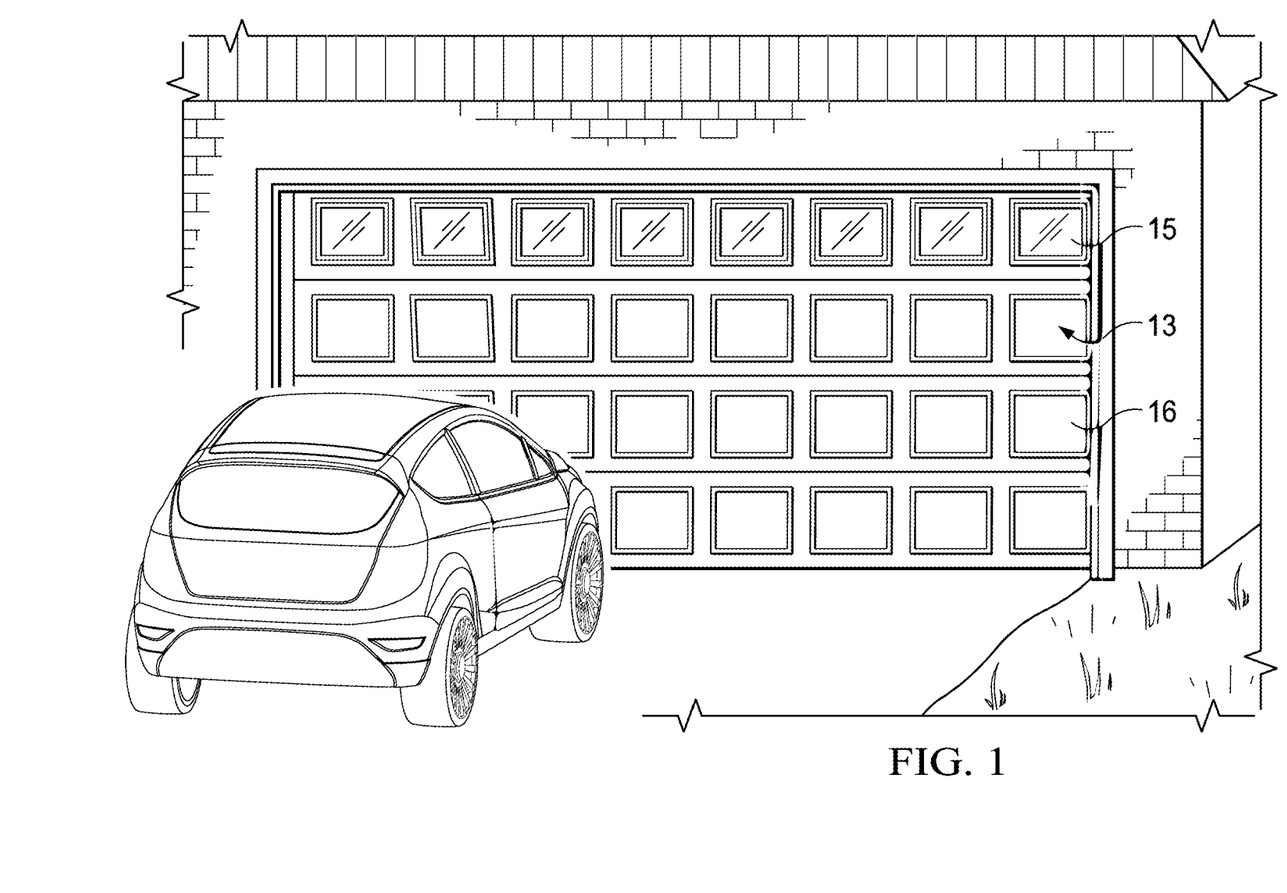
FIG. 1 is a perspective view of an overhead sectional garage door of the type which uses the wind and debris resistant window frame of the invention.

In many of the presently available garage door systems, a series of plain or decorative windows are incorporated the garage door, typically within an upper section of the garage door. These windows are formed in individual panels of the upper section and provide daylight illumination of the closed garage and can provide a decorative appearance, as well. A window opening is formed in each panel. Applicant's FIG. 1 shows a typical garage door 13 having window assemblies 15 installed into openings provided in a top section thereof. The garage door illustrated in FIG. 1 is shown in a simplified, stylized form for ease of illustration. Those skilled in the art will understand that such door are typically provided, for example with a decorative surface treatment which is designed to mimic conventional wood panels while structurally imparting a certain degree of dimensional stability to garage door section. In many cases, a decorative overlay or "trim" (not shown) is mounted in the exterior frame of the window frame assembly.

The present invention is concerned with further improvements and refinements in garage window frame design which designs are particularly suited for use in high wind prone area, for example, in South Florida. The combination garage door and improved window frame assembly of the invention will now be described with respect to FIGS. 1-4 of the drawings. As previously mentioned, FIG. 1 shows a typical residential garage door which includes the metal overhead garage door 13 having front and rear exposed surfaces 16, 18, (FIGS. 1 and 4) and at least one window opening (such as the window opening for the pane 15 in FIG. 1) formed therein.

Figure 2:
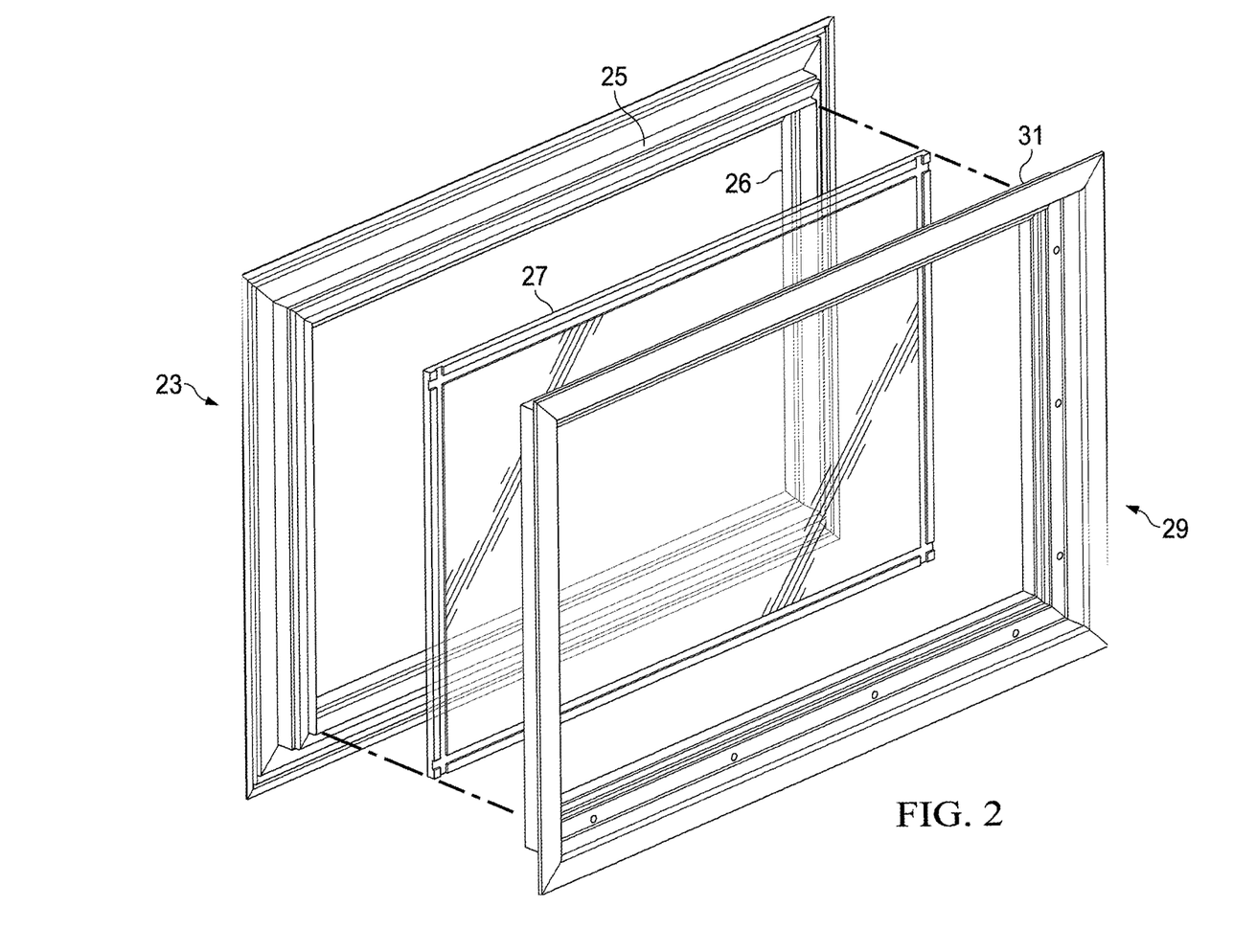

As shown in FIG. 2, a front window frame member 23 is provided which is formed of a suitable synthetic, polymeric plastic type material, to be described more fully in the description which follows. The frame member 23 has a periphery 25 which is sized to circumscribe the window opening from the front exposed surface 16 of the door 13. The member 23 also has a windowpane opening 26 for receiving a transparent pane 27. The transparent pane will conveniently be formed of glass, plastic or acrylic or other suitable synthetic material, such as a suitable polycarbonate material. Preferably, for this intended application, the pane 27 will be a high strength plastic, acrylic, or polycarbonate material, with the polycarbonate material being preferred.

A rear window frame member 29 is also formed of a synthetic polymeric plastic type material, to be further described, and has a periphery 31 which is sized to circumscribe the window opening from the rear exposed surface 18 of the door 13. As will be appreciated from FIG. 3, the front and rear window frame members 23, 29, fit together in mating fashion to form a continuous channel region (35 in FIG. 3) which circumscribes the window opening and the outer edges of the transparent pane 27. The channel region 35 forms a generally rectangular trough which is sized to receive the thickness of the particular garage door panel which contains the window opening, the frame members "sandwiching" the door panel in between the members upon assembly in the window opening. By varying the width of the rectangular "trough" 35, garage doors of varying thicknesses can be accommodated.

It will be appreciated that, during assembly of a window frame of the type described within a garage door, the previously described window frame members are placed in the frame opening with a transparent pane sandwiched in between. While the figure illustrations show only a single transparent pane installed within the window frame assembly, it will be understood that a decorative trim insert could be installed, for example, in front of the pane 27 within the frame assembly. Such decorative trim assemblies are commercially available and known in the prior art. For example, such "Design Trim" is commercially available from National Door Industries, Inc. of Fort Worth, Tex.

Figure 3:
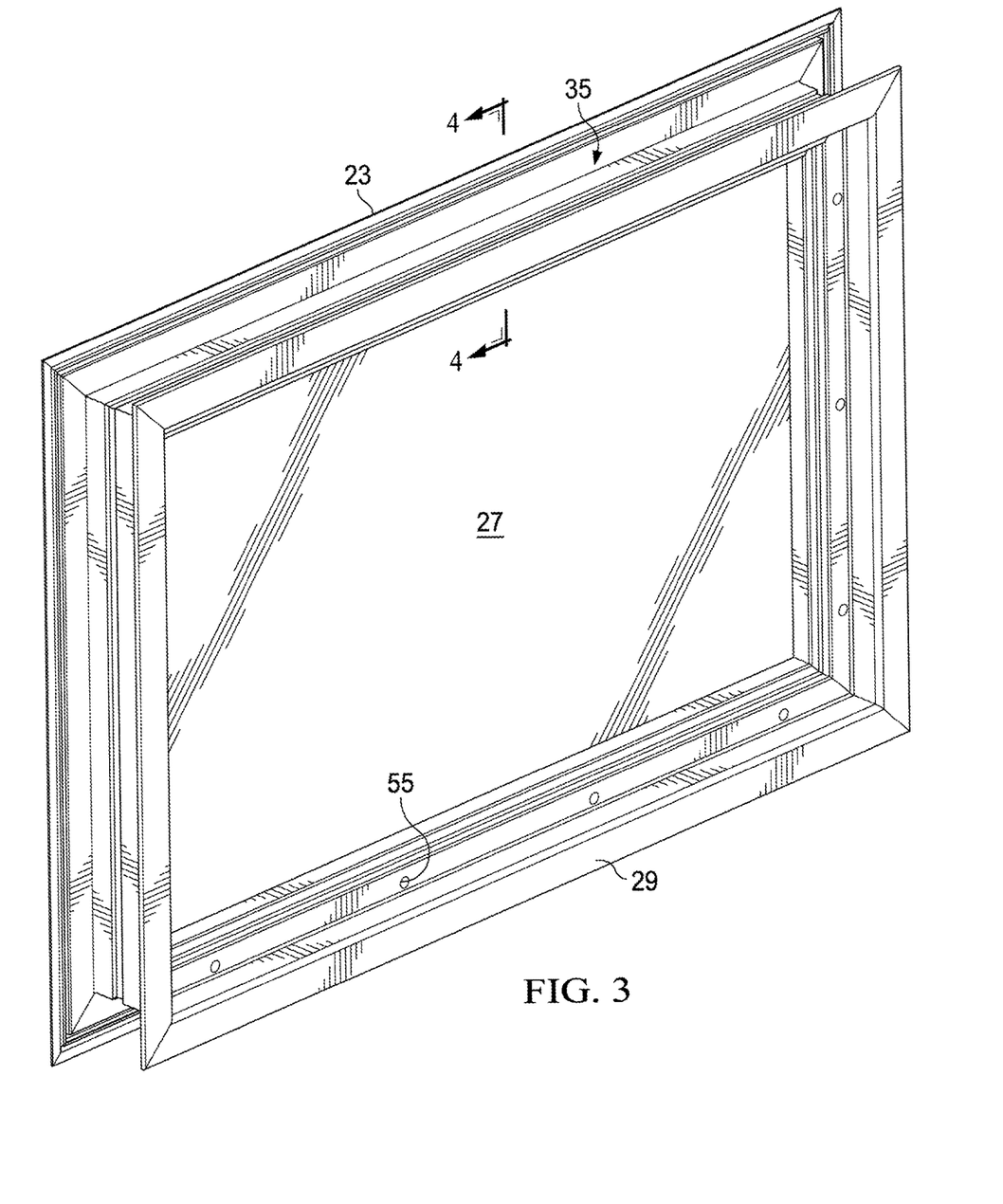
FIG. 3 is a perspective view of the frame of the invention with the front and rear frame members shown being assembled together.
Figure 4:
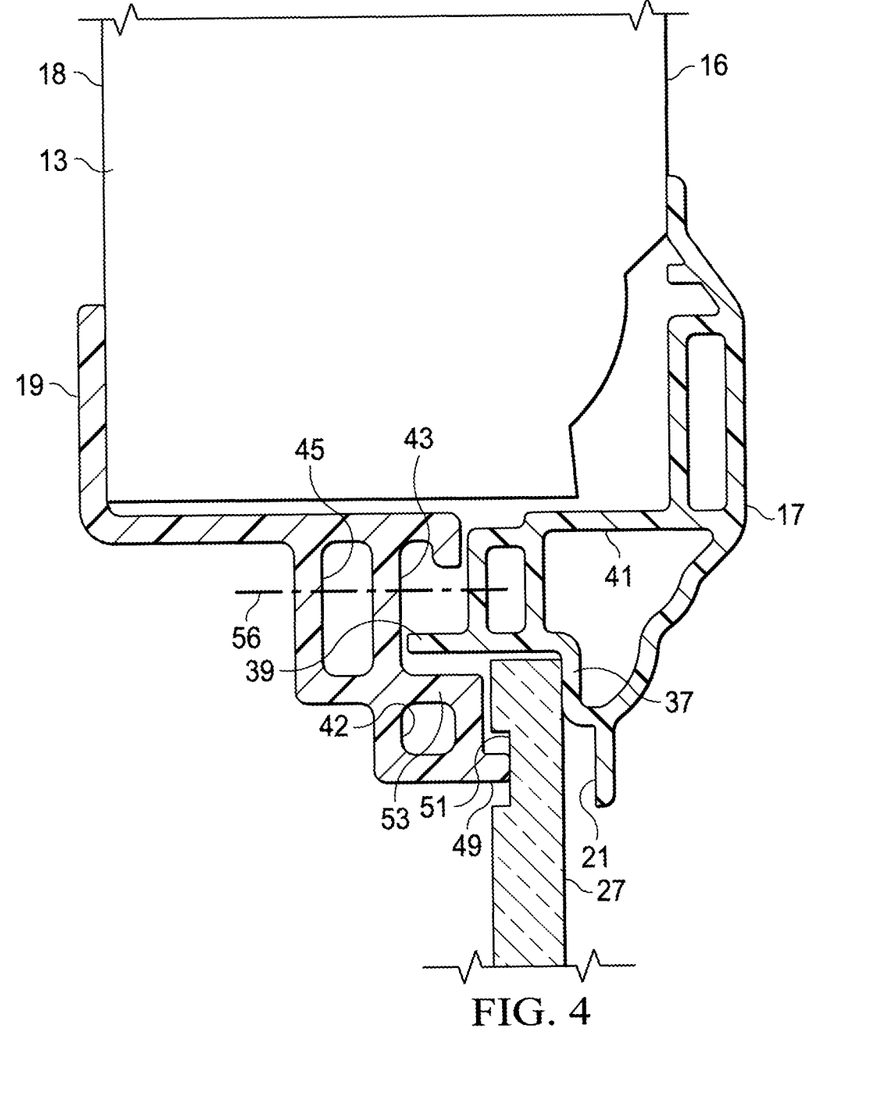
FIG. 4 is a cross sectional view taken along lines 4-4 in FIG. 3.

Turning now to FIG. 4, there is shown a cross-sectional view of the window frame assembly of the invention, as taken along lines 4-4 in FIG. 3 of the drawings. FIG. 4 shows the cross-section of the door 13 which is sandwiched between the front frame member 17 and the rear frame member 19. The front frame member 17 has an inner peripheral portion 37 which circumscribes the transparent pane 27 once the pane is installed in the assembly. The innermost region of the peripheral portion 37 comprises a flange region which overlays an outer periphery of the transparent pane 27. An internal wall 39 extends perpendicularly from the innermost region of the portion 37 generally perpendicular thereto, and creates an internal cavity in the interior of the frame assembly. The internal wall 39 also forms one side of an internal baffle or cavity 41. The right angled cavity which is formed by the internal wall 39 and outer peripheral wall 37 form a positive stop region for the outer periphery of the transparent pane 27, holding it securely in position.

With reference now to the rear frame member 19 of the window frame assembly shown in FIG. 4, this member of the assembly also has an inner peripheral portion which extends upwardly, (shown as 19 in FIG. 4) surrounding the door panel. This inner peripheral region forms a plurality of honeycomb regions (shown as 42, 43 and 45 in FIG. 4) when viewed in cross-section. The lowermost honeycomb region, as viewed in FIG. 4, has an outer circumferential rib 49 which is received within a mating recess or groove 51 provided about the outer periphery of the transparent pane 27 on the interior surface thereof. The groove 51 completely circumscribes the outer periphery of the transparent pane 27. With the internal wall 39 of the front frame member 17 coincident with and fully contacting the interior wall portion 53 of the honeycomb region 42 of the rear frame member, and with the circumferential rib 49 engaged in the circumferential groove 51, the pane is securely retained in the frame assembly.

To further secure the assembly, a series of holes (such as hole 55 in FIG. 3) can be provided on the interior of the rear frame member 19. The holes 55 can be aligned with mating openings or screw bosses or other receiving structures provided on the front frame member, whereby screws can be installed into the receiving structures provided on the front frame member. These screws would pass along the axis shown generally as 56 in FIG. 4. The thus installed screws, in conjunction with the engagement of the front and rear frame members and transparent pane previously described, make the assembly a much stronger and more durable frame package.

Figure 5:
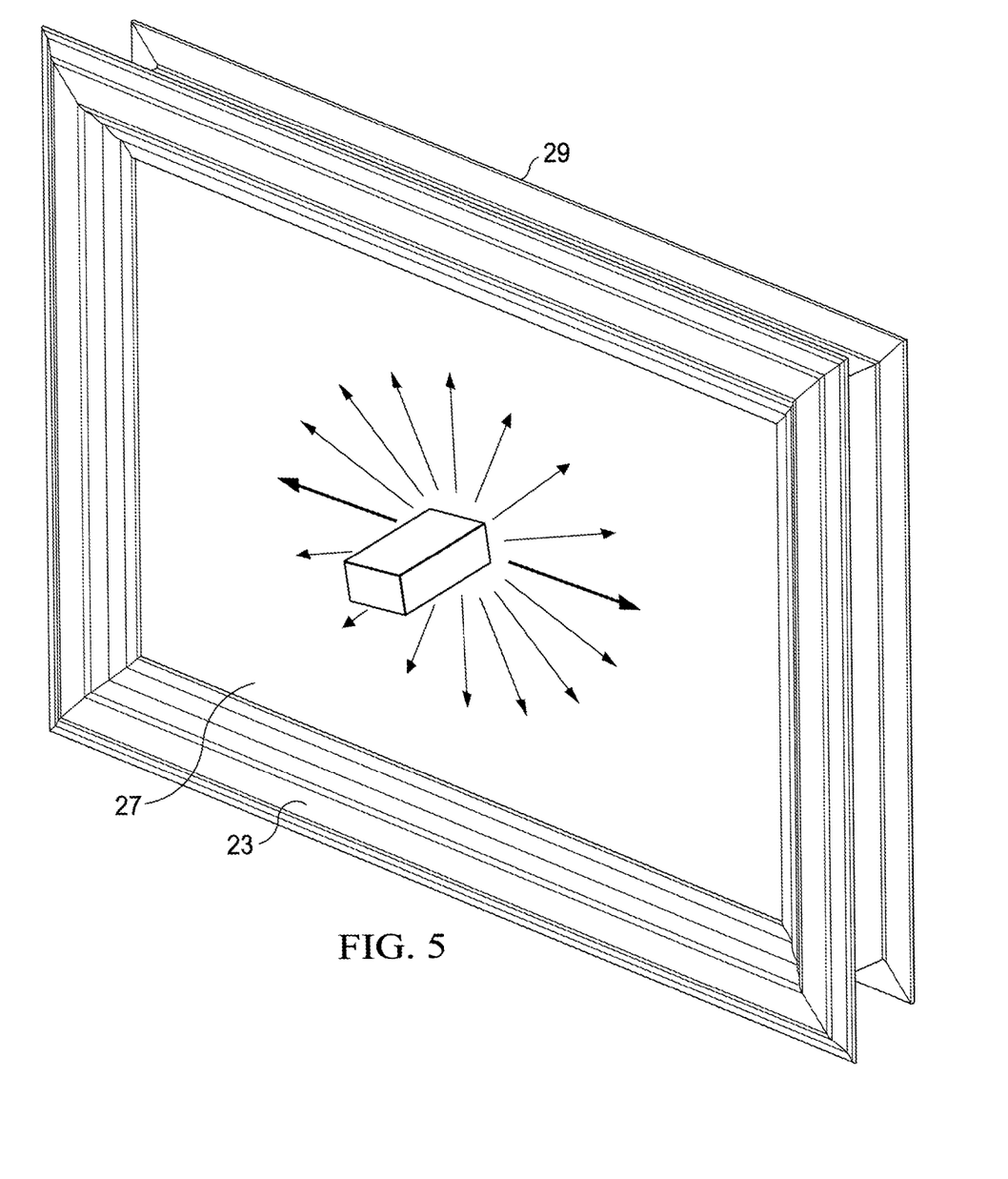
FIG. 5 is perspective view of the isolated, assembled window frame illustrating, in simplified fashion, how the impact forces of a wind borne object are distributed by the frame of the invention.

FIG. 5 is intended to represent, in simplified fashion, the distribution of forces which occurs when an object, such as flying debris, strikes the transparent pane 27. Because of the fact that the outer circumferential rib 49 of the rear frame member is received within the mating groove 51 provided about the outer periphery of the transparent pane 27, forces that are directly perpendicularly toward the surface of the pane are captured by the assembled frame members. The rib and cooperating groove arrangement, in effect, provides a "wind lock" which captures the polycarbonate pane and keeps it from being blown through the door window opening, even in high wind conditions. Note that the edges of the transparent pane (27 in FIG. 4) do not overlap the door panel 13, as in some prior art designs. As a result, the load from flying debris is not distributed over the exterior of the door panel 13, as in certain of the prior designs. Rather, the load is largely absorbed by the honeycomb structures (42, 43 and 45 in FIG. 4) of the front and rear frame members as the transparent pane 27 itself is securely gripped by the rib and groove arrangement of the cooperating frame members.

In addition to having the previously described wind and debris resistant mechanical structural features, the window frame assemblies of the invention also have unique characteristics which result from the starting materials used and the unique manufacturing processes employed in their design and manufacture. As has been previously explained, the window frame assemblies of the invention utilize unique synthetic, polymeric plastic type starting materials, rather than using metals such as extruded aluminum. In addition, different starting materials are typically used for the outside and inside frame components. For example, it is most important that the outside frame component be paintable and be more weatherable than the inside frame member, since it is exposed to the elements.

In one preferred example, the interior frame member is a high impact strength and high tensile strength Nylon-6 polymer, which is preferably extrudable. One particularly preferred polyamide polymer is sold commercially as the Akulon™ Fuel Lock FL40-HPXI. It has the following published characteristics:

| | dry/cond. | | |
|---|---|---|---|
| Mechanical properties | | | |
| Tensile modulus | 1880/500 | MPa | ISO 527-1/-2 |
| Yield stress | 43/— | MPa | ISO 527-1/-2 |
| Yield strain | 4/— | % | ISO 527-1/-2 |
| Nominal strain at break | >50/>50 | % | ISO 527-1/-2 |
| Flexural modulus | 1800/— | MPa | ISO 178 |
| Flexural strength | 71/— | MPa | ISO 178 |

| | dry/cond. | | |
|---|---|---|---|
| Charpy impact strength (+23° C.) | N/N | kJ/m² | ISO 179/1eU |
| Charpy impact strength (−30° C.) | N/N | kJ/m² | ISO 179/1eU |
| Charpy notched impact strength (+23° C.) | 100/N | kJ/m² | ISO 179/1eA |
| Charpy notched impact strength (−30° C.) | 25/18 | kJ/m² | |
| Thermal properties | | | |
| Vicat softening temperature (50° C./h 50N) | 130/— | ° C. | ISO 306 |
| Other properties | | | |
| Water absorption | 7.3/— | % | Sim. to ISO 62 |
| Humidity absorption | 2.7/— | % | Sim to ISO 62 |
| Density | 1060/— | kg/m² | ISO 1883; |

The exterior frame member is preferably a weatherable, high impact strength and high tensile strength paintable ASA polycarbonate polymer blend. In the particularly preferred example being discussed, the exterior frame component in one case was a polycarbonate+ASA blend available commercially as the SABIC GELOY™ XP4034PC+ASA having the following published characteristics:
Available Properties
Density, ASTM D 792
Water Absorption, ASTM D 570.24 hours @ 73 F
Linear Mold Shrinkage, Flow, ASTM D 955, 0.125 inch
Linear Mold Shrinkage, Transverse, ASTM D 955, 0.125 inch
Melt Flow, ASTM D 1238, 280 C/3.8 kgf
Hardness, Rockwell R, ASTM D 785
Tensile Strength, Yield, ASTM D 638, Type I, 2.0 in/min
Elongation at Break, ASTM D 638, Type I, 2.0 in/min
Flexural Yield Strength, ASTM D 790, 0.05 in/min, 2" span
Flexural Modulus, ASTM D 790, 0.05 in/min, 2" span
Izod Impact, Notched, ASTM D 256, 73 F
Izod Impact, Notched, ASTM D 256
Gardner Impact, ASTM D 3763, Instrumented Impact Total Energy
Gardner Impact, ASTM D 3763, Instrumented Impact Total Energy
CTE, linear, Parallel to Flow, ASTM E 831
CTE, linear, Transverse to Flow, ASTM E 831
Thermal Conductivity, ASTM C 177
Deflection Temperature at 0.46 MPa (66 psi), ASTM D 648, 0.125 inch, unannealed
Deflection Temperature at 1.8 MPa (264 psi), ASTM D 648, 0.250 inch, unannealed
Gloss, ASTM D 523, Untextured, 60 degrees.

Using the above materials, a frame assembly can be constructed which is characterized as having a tensile strength which meets or exceeds 8,000 psi in testing.

Figure 6:
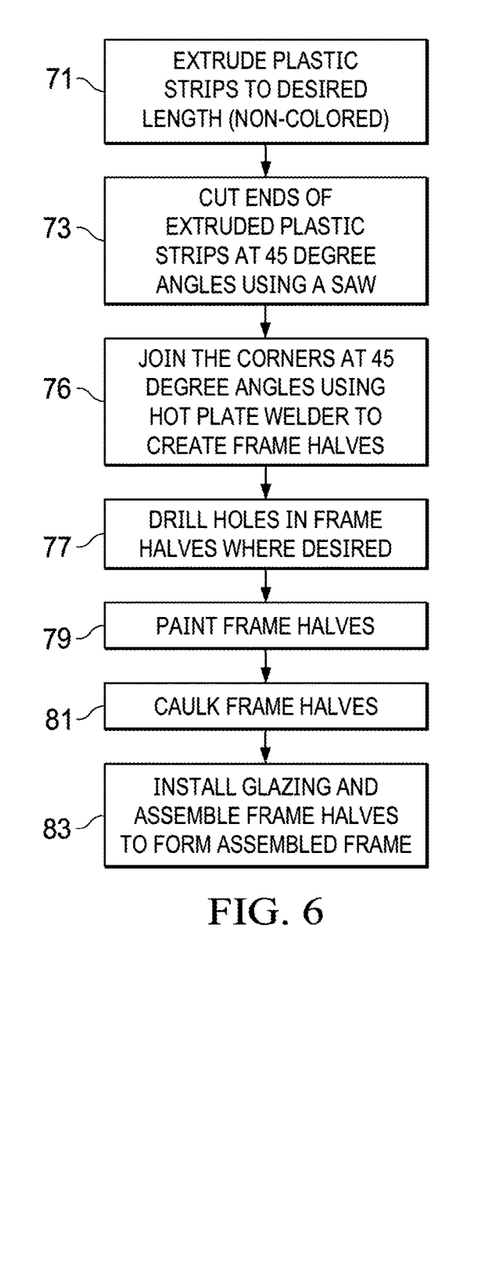
FIG. 6 is a flow chart illustrating, in simplified fashion, the steps in manufacturing a polymeric window frame using a non-colored synthetic starting stock.
Figure 7:
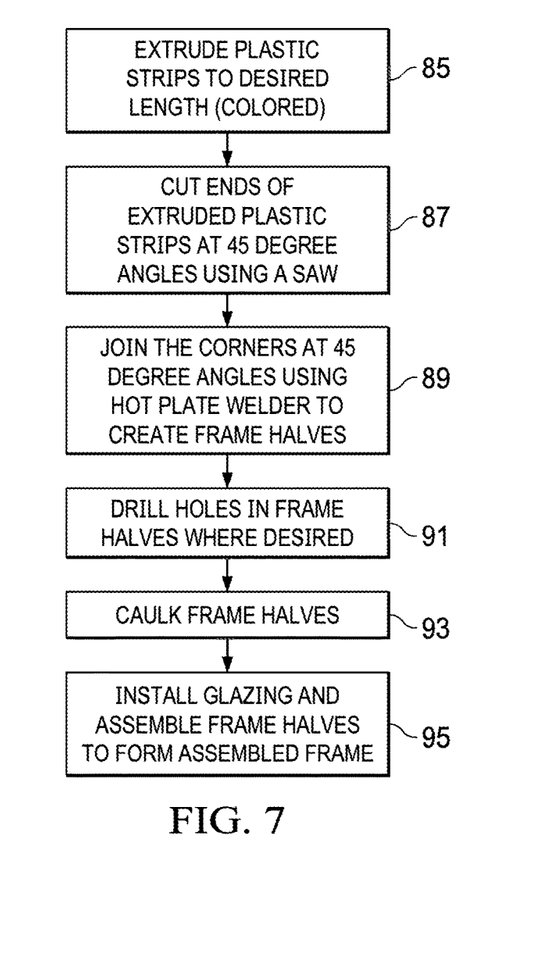
FIG. 7 is a flow chart, similar to FIG. 6, but showing the steps in the manufacturing process using a colored synthetic starting stock.

FIGS. 6 and 7 are simplified flow charts which show the steps in manufacturing the improved window frame assemblies of the invention. In FIG. 6, the starting stock is non-colored. In FIG. 7, the starting stock is colored. FIGS. 8-11 show a portion of a commercially available Beckhoff™ hot plate welder used in the manufacturing process. It is capable of processing on the order of 85 window frames per hour.

Figure 8:
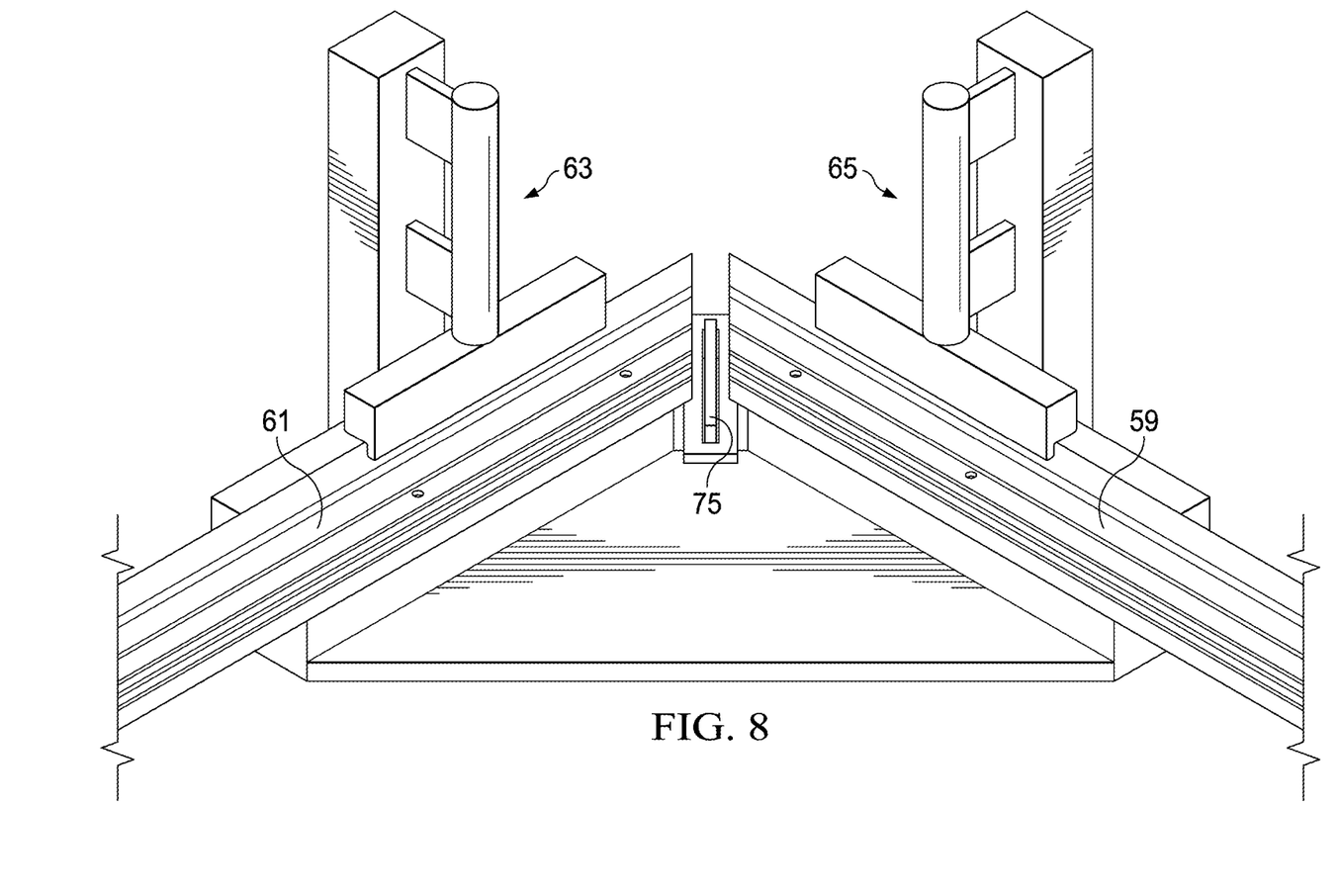
FIGS. 8-11 are views of the operative region of the hot plate welder used to join the polymeric window frame components, showing the sequential steps in the manufacturing operation.
Figure 9:
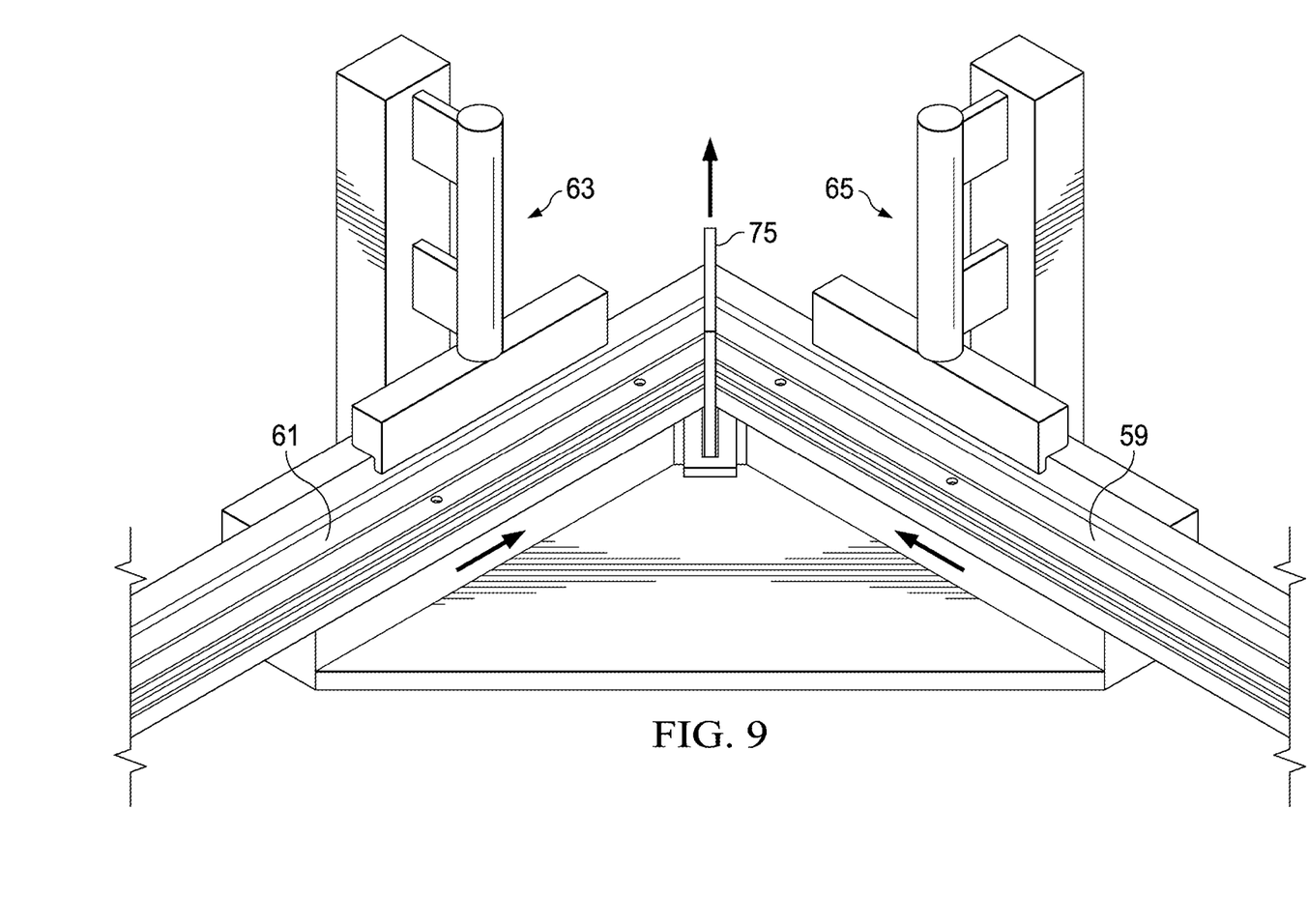
Figure 10:
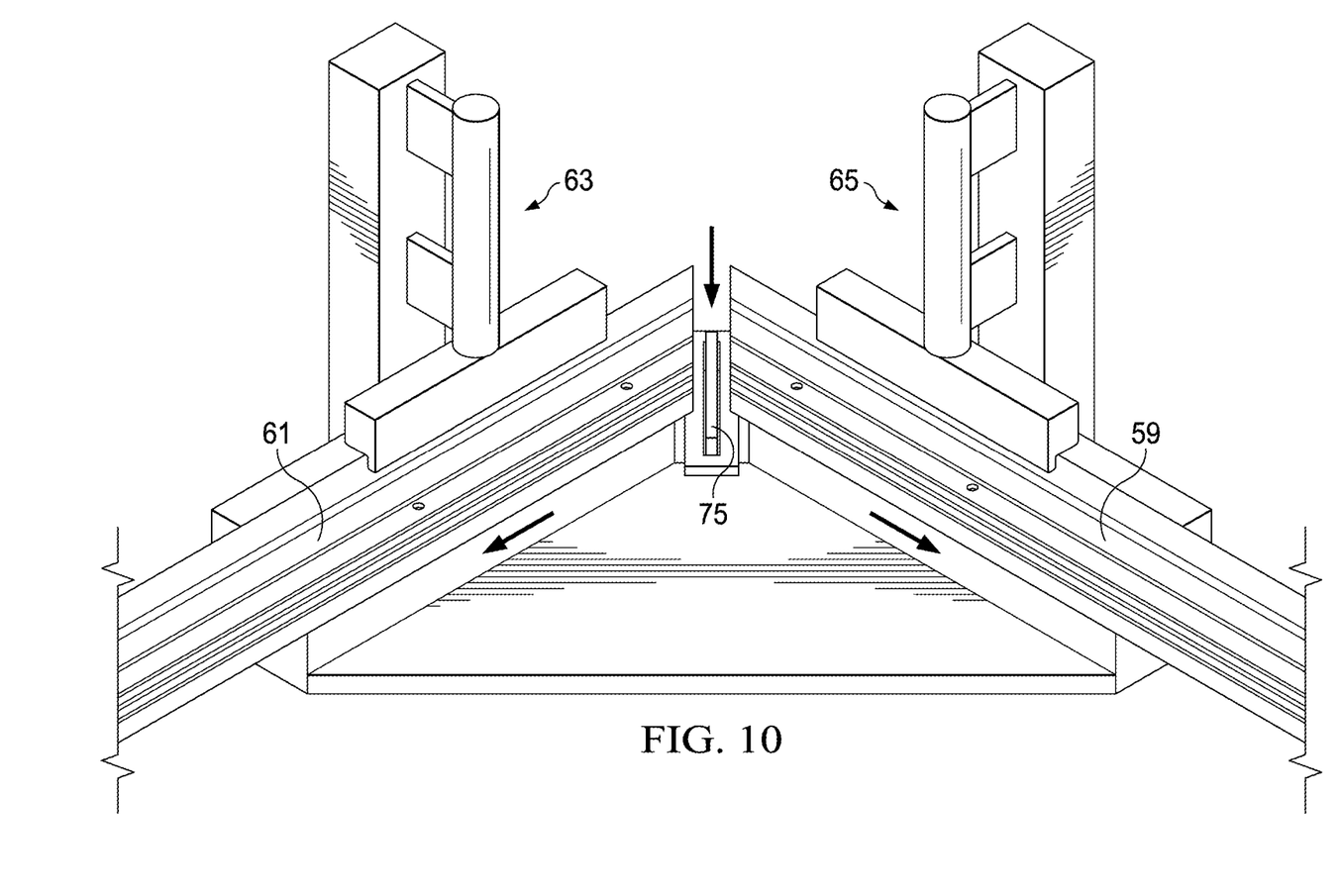

FIG. 8 shows the starting step of the process in which two frame components 59, 61 are being held in position in the jig fixtures 63, 65, of the hot plate welder. The frame components 59, 61, had previously been extruded from a (in this case non-colored) starting stock comprised by one of the plastic materials discussed above. The ends (67, 69 in FIG. 8) of the extruded plastic strips had also previously been cut at 45 degree angles using a suitable saw such that each front frame member strip is trapezoidal, with the inner peripheral portion of each front frame member strip being the short parallel side of the trapezoid and the outer peripheral portion being the long parallel side of the trapezoid.

Figure 11:
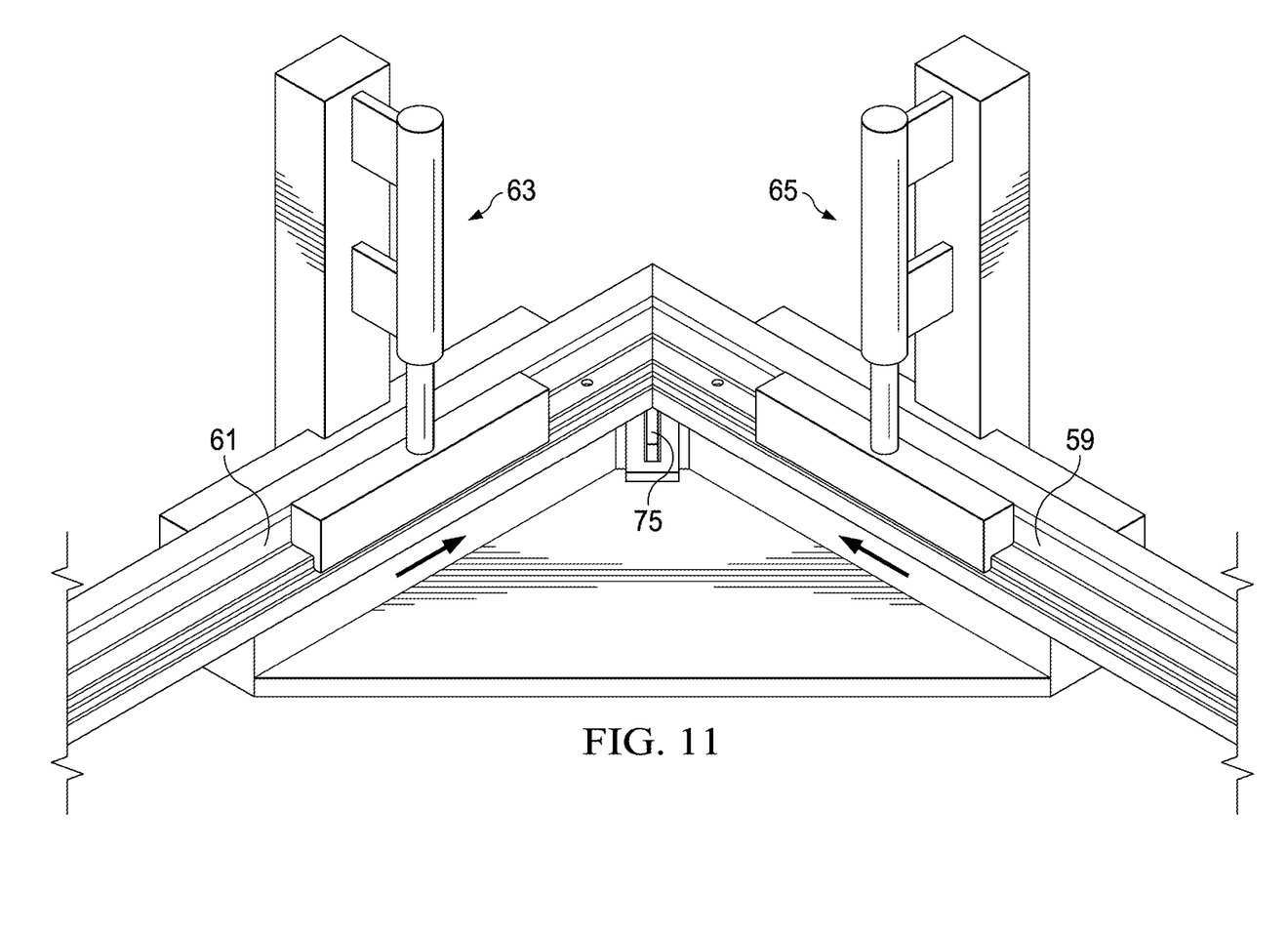

The frame components are placed in the positions shown by hand. These steps are indicated as 71, 73, in FIG. 8. The hot plate welded is then actuated, causing the hot plate 75 to move vertically upward to the position shown in FIG. 9 where it contacts the frame ends and partially melts the frame ends. After a predetermined period of time, the hot plate 75 is then retracted vertically downward to the position shown in FIG. 10. The plastic strips 59,61 are then moved into contact, as shown in FIG. 11, where they are fused together. This step is indicated as 76 in FIG. 6. The same process used to form an "L" shape is then repeated to form a completed frame half.

It is usually desirable at this point to drill the assembly holes in the frame halves where desired. This step is indicated as 77 in FIG. 6. The assembly holes generally pass along the axis 56 in FIG. 4, as previously described. The frame halves can then be painted, caulked and the glazing can be installed with the frame halves being assembled about a transparent pane to form the completed assembled frame. These steps are indicated as 79, 81, 83, in FIG. 6. While it is still necessary to paint the frame components using the process described in FIG. 6, the painting can be with an acrylic type paint and the tedious steps of stripping, sanding, etching, priming, etc., are not required as would be the case with an aluminum frame component.

FIG. 7 is a flow chart of a similar process, but using a starting stock of a plastic material of the type previously described which has, in this, case, been colored. In other words, the coloring agent is incorporated into the polymeric base before the polymer is extruded to form the plastic strips used in the process. The steps in this process are indicated as 85-95 in FIG. 7. The steps are basically the same as those described with reference to FIG. 6, except that the step of painting the strips (79 in FIG. 6) has been eliminated. This process has all the same advantages as the process shown in FIG. 6 but also eliminates the time involved in the painting step. It is also not necessary to have any drying time for exterior paint to dry.

An invention has been provided with several advantages. It has been found that prior art window frame assemblies are typically prone to breakage in the presence of flying debris in that impact energy exposes the frame components to stress and shear forces that can cause them to break. The present invention absorbs impact energy created, for example, from flying debris produced by high winds, and more effectively distributes this energy so as to avoid damage to the window pane or to the surrounding garage door panel. By protecting the transparent panel, the improved frame assembly prevents any wind or objects from coming inside the protected interior of the garage. This advantageous result is obtained while, at the same time, using frame components which are comprised of a synthetic, polymeric plastic type starting materials. This allows the frame components to be manufactured at a lower cost and in a shorter amount of time than using conventional extruded aluminum metal components.

The garage door window frame assembly of the invention is simple in design and economical to manufacture using frame members which are made from plastic type materials. The front and rear frame members and associated transparent pane are provided with mating engagement means in the form of a cooperating rib and groove type mechanism which securely grips the transparent pane once the frame assembly is installed in the door window opening. The rib and groove feature of the assembled frame prevents the transparent pane from blowing through into the interior of the structure, even if struck by flying debris of the type commonly encountered in high wind and hurricane conditions.

While the invention has been shown in only two of its forms, it will be appreciated that it is not thus limited, but is susceptible to various changes and modifications without departing from the spirit thereof.

What is claimed is:

1. A method of manufacturing wind and debris resistant window frame assembly for an overhead garage door, the method comprising the steps of:
   providing a starting stock of plastic material;
   extruding a plurality of strips of the plastic material to a desired length;
   cutting the ends of the extruded plastic strips at a 45 degree angle using a saw;
   joining selected corners of the plastic strips at 45 degree angles using a hot plate welder to create a pair of frame halves;
   drilling assembly holes in the frame halves;
   caulking the frame halves;
   installing glazing between the frame halves;
   installing screws in the assembly holes and assembling the frame halves to form an assembled frame;
   wherein the frame halves comprise an exterior frame member and an interior frame member and wherein different starting stocks are used for the exterior and interior frame members, the interior frame member being a high impact strength and high tensile strength Nylon-6 polymer which is extrudable and the exterior frame member being a weatherable, high impact strength and high tensile strength paintable ASA polycarbonate polymer blend and;
   wherein the window frame assembly manufactured from the particular choice of polymeric plastic materials is characterized as having a high impact strength and high tensile strength which can withstand or exceed an 8.000 psi impact from flying debris in testing.

2. A method of manufacturing a wind and debris resistant window assembly for an overhead garage door, the door having front and rear exposed surfaces defining a thickness there between, and at least one window opening provided therein, the method comprising the steps of:
   extruding four plastic strips for constructing a front frame member, wherein each front frame member strip comprises an outer peripheral portion and an inner peripheral portion;
   cutting both ends of each front frame member strip at 45-degree angles;
   permanently joining the cut ends of two front frame member strips using heat from a hot melt welder which fuses the cut ends, such that the two front frame member strips create an L-shape, with the inner peripheral portion of each strip facing inwards, to form a first front frame member half;
   permanently joining the cut ends of the remaining two front frame member strips also using heat from a hot melt welder, such that the two front frame member strips create an L-shape, with the inner peripheral portion of each strip facing inwards, to form a second front frame member half;

forming the front frame member by permanently joining the cut ends of said first front frame member half to the cut ends of said second front frame member half to form a rectangle with the inner peripheral portion of each front frame member strip facing inwards and the outer peripheral portion of each front frame member strip facing outwards;

wherein when the front frame member is assembled, the combined outer peripheral portions of the front frame member strips are sized to circumscribe the window opening from the front exposed surface of the garage door once the assembly is installed in the garage door, and the combined inner peripheral portions of the front frame member strips are sized to circumscribe an edge of a transparent pane once said pane is installed in the assembly;

forming a rear frame member using the same steps as used to form the front frame member;

whereby the front and rear frame members cooperate, upon assembly, to securely grip the transparent pane with the transparent pane sandwiched therebetween;

wherein the inner peripheral portion of the front frame member comprises a flange region which overlays an outer periphery of the transparent pane, and wherein an internal wall extends perpendicularly from the inner peripheral portion generally perpendicular thereto, thereby creating a right-angled cavity in the interior of the front frame member;

wherein the internal wall also forms one side of an internal baffle, and wherein the right-angled cavity which is formed by the internal wall and the flange region together form a positive stop region for the outer periphery of the transparent pane, holding it securely in position;

wherein the rear frame member is provided with a plurality of honeycomb regions, and wherein-at least one of the honeycomb regions of the rear frame member has an interior wall portion arranged perpendicular to the outer periphery of the transparent pane, the at least one honeycomb region also being provided with an outer circumferential rib which is received within a mating groove provided on the transparent pane to form a cooperating rib and groove arrangement, and wherein the front frame member internal wall is arranged coincident with and fully contacting the interior wall portion of the at least one honeycomb region of the rear frame member upon assembly, whereby the pane is securely retained in the frame assembly;

wherein upon assembling the front and rear frame members and transparent pane within the window opening of the garage door, impact forces transmitted to the transparent pane are absorbed in the honeycomb regions of the assembled frame while the cooperating rib and groove arrangement securely grips the transparent pane between the front and rear frame members;

wherein the rear frame member is a high impact and high tensile strength Nylon-6 polymer having the following published characteristics:

| Mechanical properties | dry/cond. | | |
|---|---|---|---|
| Tensile modulus | 1880/500 | MPa | ISO 527-1/-2 |
| Yield stress | 43/— | MPa | ISO 527-1/-2 |
| Yield strain | 4/— | % | ISO 527-1/-2 |
| Nominal strain at break | >50/>50 | % | ISO 527-1/-2 |
| Flexural modulus | 1800/— | MPa | ISO 178 |
| Flexural strength | 71/— | MPa | ISO 178 |
| Charpy impact strength (+23° C.) | N/N | kJ/m$^2$ | ISO 179/1eU |
| Charpy impact strength (−30° C.) | N/N | kJ/m$^2$ | ISO 179/1eU |
| Charpy notched impact strength (+23° C.) | 100/N | kJ/m$^2$ | ISO 179/1eA |
| Charpy notched impact strength (−30° C.) | 25/18 | kJ/m$^2$ | |
| Thermal properties | | | |
| Vicat softening temperature (50° C./h 50N) | 130/— | ° C. | ISO 306 |
| Other properties | | | |
| Water absorption | 7.3/— | % | Sim. to ISO 62 |
| Humidity absorption | 2.7/— | % | Sim to ISO 62 |
| Density | 1060/— | kg/m$^2$ | ISO 1883; | wherein the front frame member is manufactured from a weatherable, high impact strength and high tensile strength paintable ASA polycarbonate polymer blend having the following published characteristics:

Density, ASTM D 792
Water Absorption, ASTM D 570, 24 hours @ 73 F
Linear Mold Shrinkage, Flow, ASTM D 955, 0.125 inch
Linear Mold Shrinkage, Transverse, ASTM D 955, 0.125 inch
Melt Flow, ASTM D 1238, 280 C/3.8 kgf
Hardness, Rockwell R, ASTM D 785
Tensile Strength, Yield, ASTM D 638, Type I, 2.0 in/min
Elongation at Break, ASTM D 638, Type I, 2.0 in/min
Flexural Yield Strength, ASTM D 790, 0.05 in/min, 2" span
Flexural Modulus, ASTM D 790, 0.05 in/min, 2" span
Izod Impact, Notched, ASTM D 256, 73 F
Izod Impact, Notched, ASTM D 256
Gardner Impact, ASTM D 3763, Instrumented Impact Total Energy
Gardner Impact, ASTM D 3763, Instrumented Impact Total Energy
CTE, linear, Parallel to Flow, ASTM E 831
CTE, linear, Transverse to Flow, ASTM E 831
Thermal Conductivity, ASTM C 177
Deflection Temperature at 0.46 MPa (66 psi), ASTM D 648, 0.125 inch, unannealed
Deflection Temperature at 1.8 MPa (264 psi), ASTM D 648, 0.250 inch, unannealed
Gloss, ASTM D 523, Untextured, 60 degrees;
and wherein the window frame assembly manufactured from the particular choice of polymeric plastic materials is characterized as having a high impact strength and high tensile strength which can withstand or exceed an 8,000 psi impact from flying debris in testing.

3. The method of claim 2, wherein the extruded plastic strips are formed of a starting stock of a synthetic polymeric plastic material which includes a coloring additive prior to extrusion.

* * * * *